April 6, 1954   W. RIEDEL ET AL   2,674,088
RETRACTABLE ROCKET IGNITER

Filed May 31, 1949   2 Sheets-Sheet 1

INVENTORS:
W. RIEDEL
L. J. WESSELS
BY
William R. Lane
ATTORNEY

Patented Apr. 6, 1954

2,674,088

UNITED STATES PATENT OFFICE 2,674,088

RETRACTABLE ROCKET IGNITER

Walther Riedel and Lewis J. Wessels, Los Angeles, Calif., assignors to North American Aviation, Inc.

Application May 31, 1949, Serial No. 96,373

4 Claims. (Cl. 60—35.6)

This invention pertains to the firing of rocket motors and particularly to the initial ignition thereof.

The propellants in a rocket motor are normally furnished through orifices in the combustion chamber of the motor while the exhaust gases are discharged at high velocity through the throat section of the motor. Continuous burning of the propellants takes place in the combustion chamber once reaction is initiated. However, in order to initiate the reaction, it has in the past been necessary to provide some sort of structure within the rocket motor and carried thereby for the purpose of igniting the fuel and oxidizer when the motor is first started.

It is an object of this invention to provide means for igniting a rocket motor which is independent of the rocket motor structure.

It is another object of this invention to provide a positive ignition device for firing a rocket motor.

It is a further object of this invention to provide a rocket motor igniter which can be retracted from the combustion chamber after ignition.

It is a further object of this invention to provide a rocket motor igniter which automatically removes itself from the rocket motor combustion chamber upon ignition of the propellants contained therein.

Figure 3:
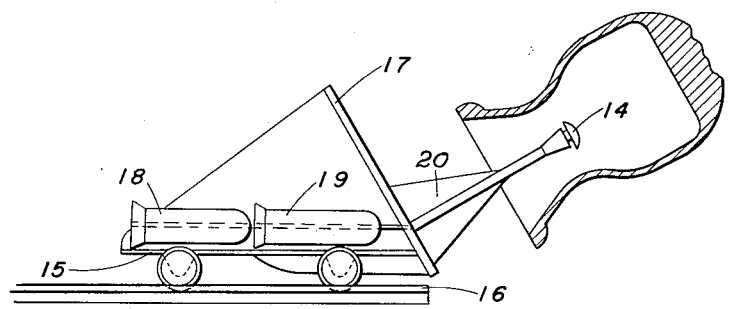
Figure 1:
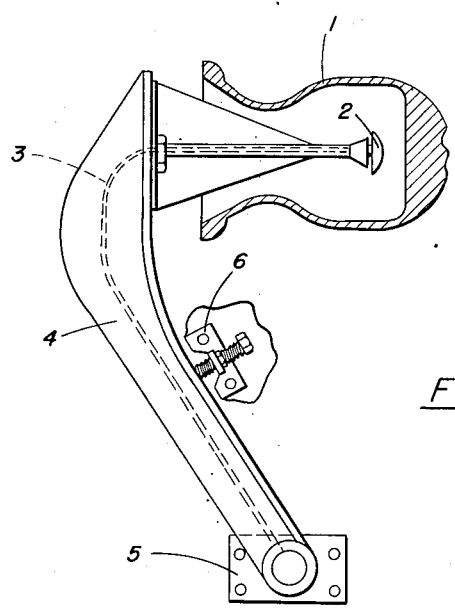
Figure 2:
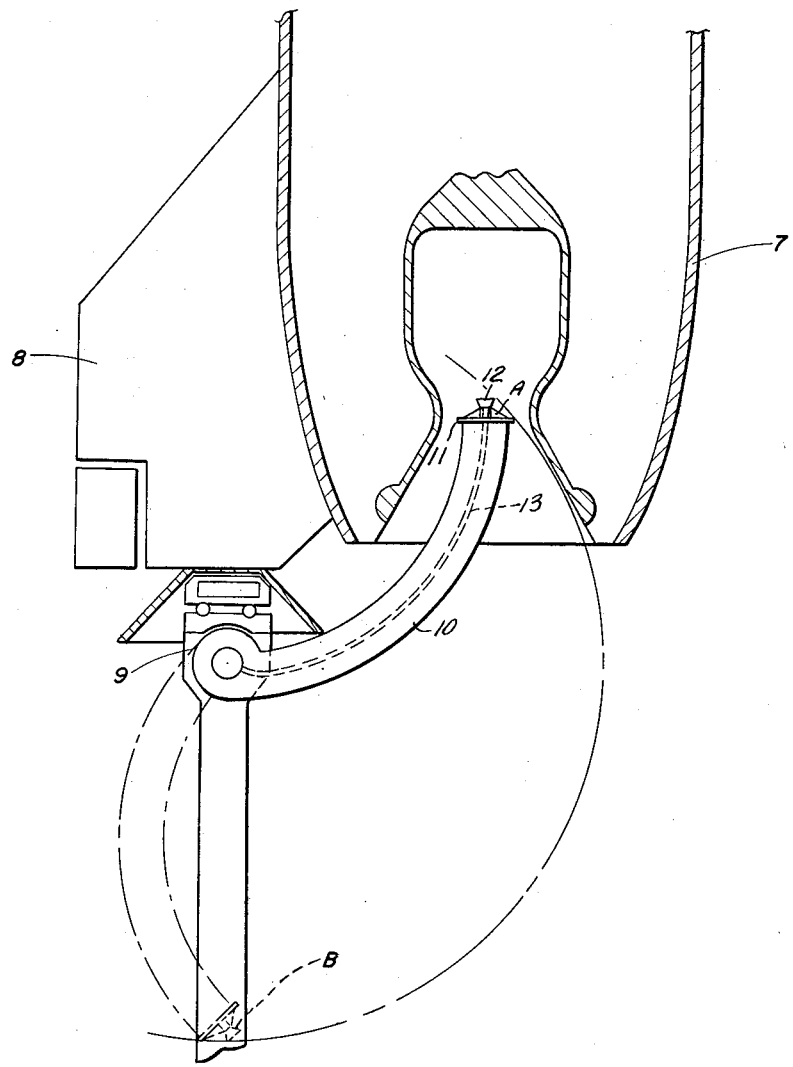

Other objects of invention will become apparent from the following description taken in connection with the accompanying drawings in which:

Fig. 1 is a schematic of one embodiment of the invention shown with a rocket motor partially in section, Fig. 2 is a second embodiment of the invention shown in Fig. 1, And Fig. 3 is a third embodiment of the invention.

Referring to Fig. 1 there is shown a rocket motor 1, an igniter 2, conduit 3, and a retractor arm 4, pivotable on support bracket 5 and adjustable in position by bracket 6. The device shown in Fig. 1 functions as follows: When the rocket motor is ready for firing, igniter head 2 is thrust into the mouth of the rocket motor. Igniter head 2 contains an igniter of the hypergolic type. Therefore, when fluid of the proper type is introduced through conduit 3 to igniter head 2, spontaneous combustion occurs upon contact with the igniter head or oxygen in the rocket combustion chamber or an oxidizer introduced by a second pipeline of conduit 3, and, valves controlling the flow of fuel and oxidizer into the rocket motor meanwhile having been turned on, firing of the rocket motor occurs. Firing of the rocket motor causes an immediate rise of the inner chamber pressure. The exhaust gas blows the igniter head and retractor arm out of the rocket motor along an arcuate path about pivot bracket 5. Igniter head 2 may then be renewed or replaced and the device can be used repeatedly.

The device shown in Fig. 2 differs in certain respects from that shown in Fig. 1. In Fig. 2 rocket projectile 7 is shown in a vertical launching position with pivot bracket 9 serving as a support under a ring support for fins 8 of the missile. Retractor arm 10 is fitted with a horizontal flat plate 11 somewhat smaller than the inside diameter of the rocket motor to serve as a "sail" when the initial reaction between the propellants occurs in the rocket motor. The device shown in Fig. 2 also differs from that shown in Fig. 1 in that igniter head 12 may be pyrotechnic or liquid propellant torch or flame-throwing device. The liquids may be fed by a conduit 13 and separately ignited in the retracted position of arm 10 shown at B in Fig. 2 or may act as self-igniting fluids in position A. Alternately, the igniter may be ignited electrically in the unretracted position by means of suitable conductors and spark producing apparatus or by heat wire or pyrotechnic squib (not shown). To operate the device shown in Fig. 2, it is necessary only to start the igniter head 12 separately in retracted position and then position retractor arm 10 to position A whence a flame is then introduced into the combustion chamber of the rocket motor. The fuel lines to the rocket motor are then opened and combustion occurs driving retractor arm 10 downward in arcuate motion about bracket 9. The retracted arm 10 will be arrested in this position.

There is thus provided a means for securing positive ignition of a rocket motor. This invention may be used repeatedly and installed permanently at the test site or on the launching tower and may be controlled remotely to prevent danger to personnel.

In Fig. 3 there is shown a third embodiment of the invention. Whenever it is required to launch the jet propelled vehicle in a horizontal or semi-horizontal position, it is convenient to mount igniter head 14 on wheel supported chassis 15 riding on rails 16 or other suitable support. When ignition of the motor is completed, the resultant blast of hot gases propels chassis 15 rearwardly on rails 16 by means of wind resistant sail 17 arranged so as to transmit a component of blast force along rails 16, thereby removing chassis 15 from the line of action of the spent gases. Containers 18 and 19 mounted on chassis 15 carry igniter fluids under pressure. These igniter fluids are conducted to igniter head 14 by means of fluid conduits (not shown) in igniter arm 20. Flow of fluids in these conduits may be remotely controlled by electrically operated valves of any suitable type.

In all the foregoing embodiments of the invention, the flame used to ignite the rocket motor may be produced electrically, chemically, as by mixing two hypergols, or by heating the igniter head by any other known means.

Although the invention has been described and illustrated in detail, it is to be clearly understood that the same is by way of illustration and example only and is not to be taken by way of limitation, the spirit and scope of this invention being limited only by terms of the appended claims.

We claim:

1. Means for igniting a rocket motor having a throat section, a combustion chamber and means for introducing a combustible mixture of propellants into said combustion chamber comprising igniter means smaller than said throat for producing a flame, arm means attached at one of its ends to said igniter means, and means for supporting said arm means for insertion into and retraction from said rocket motor throat.

2. Means for igniting a rocket motor having a throat section, a combustion chamber and means for introducing a combustible mixture of propellants into said combustion chamber comprising a heat source for producing a flame from the burning of combustible fluids, arm means for supporting said heat source at one end thereof for supplying combustible fluids to said heat source, bracket means fixed in space, means for pivotally supporting said arm on said bracket means at the end opposite said heat source to allow said heat source to be inserted into and withdrawn from the throat of said rocket motor.

3. Means for igniting a rocket motor having a throat section, a combustion chamber, and means for introducing combustible propellants into said chamber comprising igniter means smaller than said throat section for projecting a flame, a rigid arm carrying said igniter means on one end and pivotable about its other end and fixed bracket means serving as a pivot point for said rigid arm and so located with respect to said rocket motor as to allow said igniter means to be introduced into said rocket motor throat and retracted therefrom by arcuate motion of said arm.

4. A device as recited in claim 3 and further comprising wind resistant means carried by said arm whereby when said rocket motor is ignited the resultant blast removes said arm and igniter from said rocket motor.

References Cited in the file of this patent

UNITED STATES PATENTS

| Number | Name | Date |
| --- | --- | --- |
| 455,278 | Cunningham | June 30, 1891 |
| 513,289 | West | Jan. 23, 1894 |
| 764,718 | Gordejeff | July 12, 1904 |
| 1,324,607 | Maclean | Dec. 9, 1919 |
| 1,611,353 | Lepinte | Dec. 21, 1926 |
| 2,074,098 | Adams | Mar. 16, 1937 |
| 2,440,723 | MacDonald | May 4, 1948 |
| 2,451,522 | Uhl et al. | Oct. 19, 1948 |
| 2,461,574 | Skinner et al. | Feb. 15, 1949 |
| 2,504,160 | Skinner | Apr. 18, 1950 |

FOREIGN PATENTS

| Number | Country | Date |
| --- | --- | --- |
| 108,660 | Switzerland | May 16, 1925 |